United States Patent [19]

Wheeler

[11] 3,985,382

[45] Oct. 12, 1976

[54] WEED PULLER

[76] Inventor: Harold Dale Wheeler, 11441 Acropolis Drive, Yucaipa, Calif. 92399

[22] Filed: Nov. 26, 1975

[21] Appl. No.: 635,712

Related U.S. Application Data

[63] Continuation of Ser. No. 529,623, Dec. 5, 1974, abandoned.

[52] U.S. Cl. .................. 294/50.6; 172/378; 254/132
[51] Int. Cl.² ........................................ A01B 1/16
[58] Field of Search ................ 294/19 R, 50, 50.5, 294/50.6, 50.8, 50.9, 55.5; 30/315, 317; 172/371, 377, 378, 381; 254/25, 132

[56] References Cited
UNITED STATES PATENTS

| | | | |
|---|---|---|---|
| 1,796,780 | 3/1931 | Free | 254/132 |
| 1,902,705 | 3/1933 | Kee | 294/55.5 X |
| 2,017,436 | 10/1935 | Gebhardt | 254/132 |
| 2,164,373 | 7/1939 | Ayliffe | 294/50.6 |
| 2,843,359 | 7/1958 | Franz et al. | 254/132 |

FOREIGN PATENTS OR APPLICATIONS

| | | | |
|---|---|---|---|
| 336,678 | 3/1904 | France | 294/50.6 |

*Primary Examiner*—Johnny D. Cherry
*Attorney, Agent, or Firm*—William P. Green

[57] ABSTRACT

A weed puller having a shank projecting from a handle and carrying two laterally turned prongs between which a weed is received, with the prongs having opposed weed contacting surfaces with first entrance throat portions which converge relatively rapidly toward one another to the location of inner portions of those surfaces which extend more parallel to one another and define a compression compartment within which the weed can be frictionally retained for removal from the earth by the tool.

10 Claims, 7 Drawing Figures

U.S. Patent  Oct 12, 1976  3,985,382
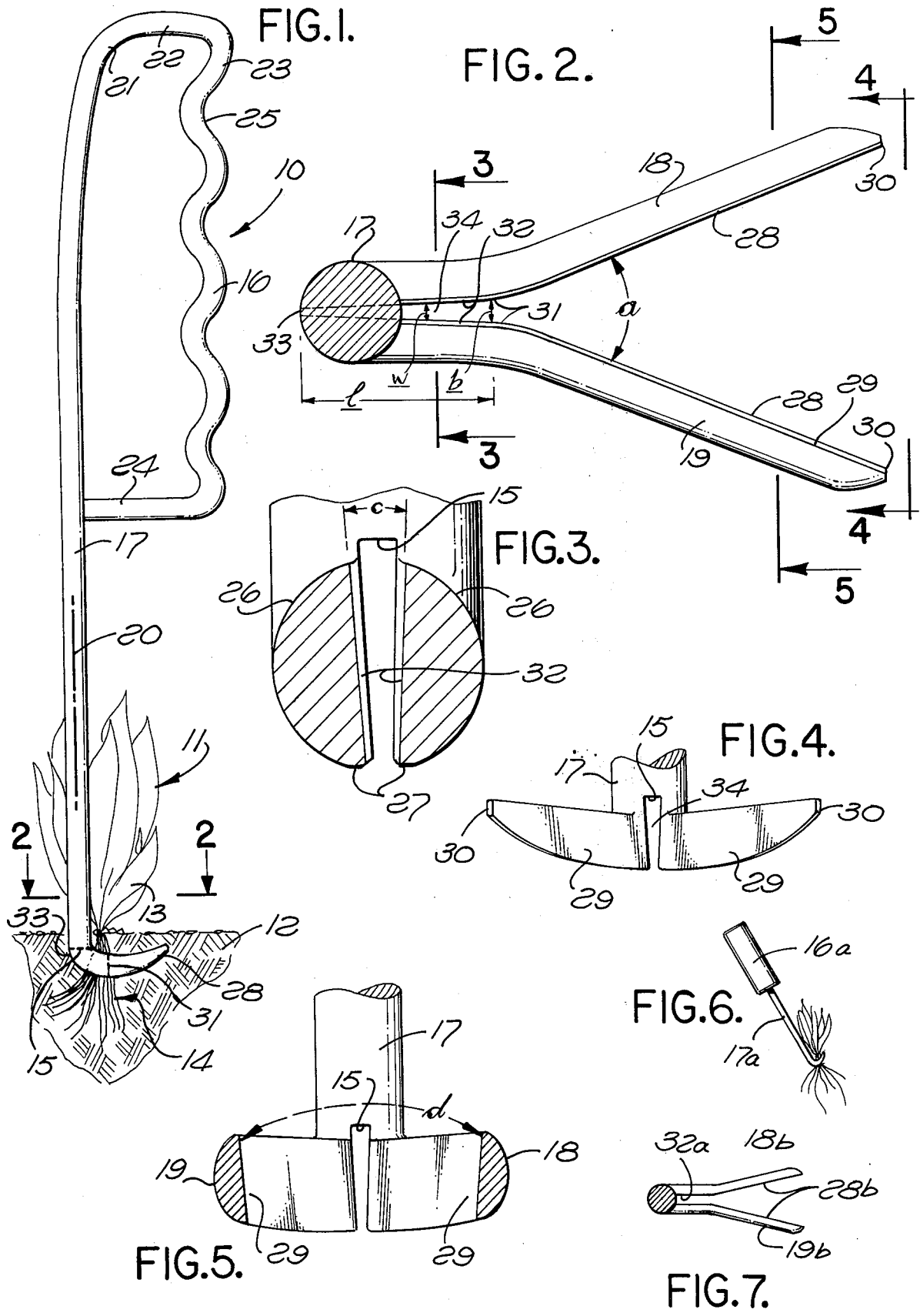

WEED PULLER

CROSS REFERENCE TO RELATED APPLICATION

This application is a continuation of copending U.S. patent application Ser. No. 529,623 filed Dec. 5, 1974 now abandoned.

BACKGROUND OF THE INVENTION

This invention relates generally to improved hand tools for pulling weeds from the earth.

Various types of tools have been proposed in the past for digging or pulling weeds from the earth. For example, one such tool is shown in U.S. Pat. No. 1,931,773, in which an elongated tool shank having the cross-section essentially of an angle iron is cut off at its end in a manner forming two diverging prongs adapted to be received at opposite side of the stem or other lower portion of a weed. Similarly, in U.S. Pat. No. 2,374,929, there are provided two prongs between which a weed is receivable, and in this case having a third sharp prong therebetween for piercing into and holding the weed. Other patents showing devices having prongs of various types which may be used for engaging and pulling a weed are U.S. Pat. Nos. 1,056,614, 1,079,619, 3,065,015, 2,194,336, 2,843,359, 1,902,705, 2,164,373, and 2,017,436, and French Pat. No. 336678 issued Mar. 15, 1904.

One disadvantage of all of these prior weed pulling tools of which I am aware results from their formation in a manner such that they can not grip and retain a weed between the prongs effectively enough to attain positive control of the weed by the tool for bodily removal of the weed in its entirety from the earth. Because of this deficiency, the tool may either unintentionally cut off the weed at the stem location, leaving the roots in the ground, or tend to slip away from proper engagement with the weed and leave the weed in the ground. Further, the prior tools have inherently tended to disturb an excessive amount of the soil around the weed, in a manner rendering it extremely difficult if not impossible to pull only the weed from the earth leaving adjacent grass or plants unaffected and in place.

SUMMARY OF THE INVENTION

The present invention provides a unique weed puller which is adapted to overcome the above discussed disadvantages of prior tools for the same purpose, and which enables a user to very easily and quickly remove a weed from a lawn or garden with very minimum disruption of the soil surface except at the precise location of the weed itself, so that even very closely proximate areas of grass or other ground cover or the like are left completely undisturbed, and in most instances the location from which the weed was removed may be almost indiscernible. At the same time, however, the action of the tool against the weed itself is so positive as to assure effective gripping and removal of the weed, including its entire root structure, and thus prevent any possibility of the weed growing back after the pulling operation. In spite of these decided and extremely important advantages in use, however, the tool may be structurally very simple and therefore inexpensive, and ruggedly built for reliable service over long periods of time.

To attain these results, I provide a tool having a pair of spaced prongs of a general type somewhat similar to those previously used in some of the above discussed prior art devices, but with the prongs being specifically constructed in a novel manner providing between inner portions of the prongs a compression or compaction compartment within which a root clump or other vertically intermediate portion of the weed slightly below ground level can be retained in closely confined relation in a manner tightly frictionally holding the root or root clump in the inter-prong compression chamber as the tool is given a twisting and/or lifting motion or other appropriate motion for pulling the weed from the earth. The control over weed movement which is accomplished in this way is sufficient to prevent accidental severing of the upper portion of the weed from its roots, and to assure a sufficient pulling action on the weed to completely remove the entire root portion from the earth. After such removal, however, the weed can easily be pulled distally from its retained position within the inter-prong compartment, in preparation for a next weed pulling operation.

To define the structure of the prongs in greater detail, the two prongs project from the shank generally transversely thereof and have inner opposed guiding surfaces facing toward one another for contacting and directing a root or root clump into the compaction compartment, with these surfaces having first entrance portions which converge progressively toward one another at a fairly rapid rate as they advance inwardly toward the shank of the tool, and with the guide surface also having second inner portions nearer the shank which are more parallel to one another than are the entrance portions. These inner portions thus form between them the discussed compaction or compression chamber, within which the weed is tightly gripped and retained during the actual weed pulling step. In one form of the invention, these inner compartment forming surfaces may be disposed substantially directly parallel to one another, while in other forms these surfaces may be disposed at slightly convergent angularities with respect to one another to assist in proper gripping of the root clump, and to facilitate ultimate removal of the weed from the compartment. More particularly, the inner compartment forming surface areas may converge progressively toward one another as they advance inwardly toward the shank, and/or they may progress gradually toward one another as they advance vertically, preferably downwardly, with both inward and vertical convergence being desirable in the arrangement currently felt optimum.

A feature of great practical importance in optimizing the functioning of the device resides in the formation of the prong structure to give the compaction compartment a unique self cleaning action, causing dirt or the like which might otherwise accumulate in the compartment ahead of a weed to be automatically forced from the compartment in a manner avoiding interference by the dirt with proper gripping of the weed. More specifically, the compaction compartment is formed to have an entrance end facing in a first direction transversely of the tool shank into the inter-prong entrance throat, and to have at the opposite end of the compaction compartment an exit end which is open in an opposite direction transversely of the shank, to allow free discharge of dirt, etc. through that exit end from the compartment.

BRIEF DESCRIPTION OF THE DRAWING

The above and other features and objects of the invention will be better understood from the following detailed description of the typical embodiments illustrated in the accompanying drawing in which:

FIG. 1 is a side view of a first form of weed pulling tool constructed in accordance with the invention;

FIG. 2 is an enlarged horizontal section taken on line 2—2 of FIG. 1;

FIG. 3 is a vertical section through the compression chamber taken on line 3—3 of FIG. 2;

FIG. 4 is a side elevational view looking inwardly toward the prongs and taken on line 4—4 of FIG. 2;

FIG. 5 is a vertical section taken on line 5—5 of FIG. 2, and showing the vertical angularity of the outer entrance throat portion of the prongs;

FIG. 6 shows the manner in which the weed is gripped by the tool during and just after removal, and also illustrates use of a different type of handle on the tool; and FIG. 7 is a reduced view similar to FIG. 2, but showing another variational arrangement.

DESCRIPTION OF THE PREFERRED EMBODIMENTS

Describing the form of the invention shown in FIGS. 1 to 5, and with particular reference first to FIG. 1, I have shown at 10 a hand tool embodying the invention which is to be utilized for pulling a weed 11 from the earth 12. The weed is illustrated as having an upper leafy portion 13 above the earth's surface and a root or root clump 14 projecting downwardly into the earth.

The tool 10 has an upper handle 16 and a shank 17 projecting downwardly therefrom and carrying two prongs 18 and 19 at the lower end of the shank for engaging and gripping the root clump. For simplicity of construction, all of these portions of the tool may be formed from a single length of rigid metal rod material, typically an appropriate steel, which rod initially has along its entire length the preferably externally cylindrical configuration illustrated in FIG. 3. The shank portion of the rod, extending between and interconnecting upper handle 16 and lower prongs 18 and 19, may be left essentially undeformed from its initial straight condition and be centered about an axis 20 which is vertical in the FIG. 1 position of the tool. At its upper end, this shank continues upwardly to a location 21, at which the rod may be bent outwardly at 22, then downwardly at 23, and inwardly at 24 to form a loop type handle as shown. The generally axial portion 23 of the handle may be irregularized as shown to form a series of grooves or recesses 25 adapted to receive the fingers of a user to enable effective gripping and manipulation of the tool.

In order to form the two divergent prongs 18 and 19 at the lower end of shank 17, the material of the rod is slit into two halves at its lower end, and those halves are then spread apart and being generally transversely of axis 20 to the condition illustrated in the figures. As seen in FIGS. 3 and 5, the outer initially cylindrical surface of the rod may be left essentially intact and of generally unchanged transverse circular curvature, to give each of the prongs 18 and 19 a circularly curved essentially cylindrical outer surface 26 facing in a direction away from the other prong. At the undersides of the prongs these cylindrical surfaces 26 are preferably slightly flattened as illustrated at 27 in FIG. 3. Also, the two prongs as they advance laterally outwardly away from axis 20 and shank 17, as seen in FIG. 1, may be slightly curved to advance slightly upwardly at the extremities 30 of the prongs.

At their inner sides, the two prongs 18 and 19 have guiding or cam surfaces 28 which face generally toward one another and are adapted to engage the root or root clump 14 of the weed and direct it into confined relation between the prongs as the prongs are moved into engagement with the root or root clump. These guiding or cam surfaces 28 may be considered as having two portions, including first portions 29 extending between the locations 30 and 31 of FIG. 2, and second inner portions 32 extending inwardly from the locations 31 toward the shank. These inner portions 32 preferably continue across the width of the shank to its left side as viewed in FIGS. 1 and 2, so that the inter-prong guideway is open at its left end 33 to facilitate self cleaning of the guideway by movement of dirt therethrough. The top of the innermost portion of the guideway may then be defined by a top wall 15 extending essentially transversely of axis 20 and essentially aligned horizontally with the tops of the prongs. The outer portions of the prongs between locations 30 and 31 form between them an entrance throat at which the angularity between these surface areas is relatively great, to enable a user to easily locate the ends of the prongs for reception therebetween of the weed root or root clump 14. This camming angularity is represented by the angle $a$ in FIG. 2, and may if desired vary somewhat along the lengths of surface areas 29, but preferably is essentially constant along the lengths of those surface areas. Near the location 31, the surfaces 28 curve progressively and smoothly in a relation causing the inner portions 32 of surfaces 28 (between locations 31 and 33) to extend more parallel to one another than do the entrance throat areas 29. In the presently preferred arrangement of FIGS. 1 to 5, these surfaces are not directly or precisely parallel to one another, but are approximately parallel. In most instances, the variation from the true parallelism should not be greater than an included angle of about 5°, though in some cases greater angularities might possibly be tolerated. For most effective control of the weed root or root clump, the surface area 32 may converge relative to one another in either of two directions, and optimally in both of those directions. One such direction of convergence is illustrated in FIG. 2, in which the two surface areas 32 are shown as converging gradually and slightly toward one another as they advance leftwardly in that view, that is, inwardly toward the axis of shank 17. This angularity is designated by the angle $b$ in FIG. 2. The second type of angularity is illustrated in FIG. 3, in which the two inner surface areas 32 are shown to converge gradually as they advance downwardly, as represented by the angle $c$. Similarly, the angularity of FIG. 3 continues outwardly past the locations 31 and through the entire lengths of the entrance throat surface areas 29, out to the extremities 30 of the prongs. This downwardly converging angularity of the surface areas 29 is represented in FIG. 5 by the angle $d$. All of these angles $b$, $c$ and $d$ of course should be very small as compared with the basic plan view angularity $a$ of the entrance throat portions of the prongs. In most instances, the angle $a$ should desirably be between about 50° and 70°, ideally about 56°, while as previously indicated the angularities $b$, $c$ and $d$ of the inner gripping portions of surfaces 29 should preferably be not greater than about 5°. Also, the horizontal length $l$ of the compaction portions of the guideway, leftwardly of the point 31 in FIG. 2, should be at least two or more times as great as the minimum width $w$ of that chamber. In the currently preferred arrangement, width $w$ is between about 0.040 of an inch and 0.060 of an inch, while the length $l$ may be approximately 0.310 of an inch.

In using the tool of FIGS. 1 to 5, a person grasps the upper handle portion 10, and so positions it as to locate the prongs 18 and 19 just slightly beneath the surface of the earth, following which the tool is manipulated to move the prongs rightwardly in FIG. 1 to the illustrated position in which the root or root clump 14 of the weed to be pulled is received between the prongs. This movement is continued until the root or root clump is forced into the restricted inner compaction chamber 34 formed between inner surfaces 32 of the prongs, requiring substantial compression and deformation of the root clump in a manner causing it to be very tightly confined and frictionally retained and gripped in that chamber. The user may then give a slight twisting and/or lifting motion to the tool, generally about a vertical axis extending through the weed, during which the tightly gripped retention of the root clump by the tool tends to cause the root clump to turn with the tool, and loosens the roots sufficiently to enable the entire weed to be pulled upwardly by the tool. The user then removes the weed in its entirety with his second hand in preparation for pulling the next successive weed. Because of the type of action utilized, the amount of disruption of the soil about the weed is minimized, and removal of the entire root portion is assured. The slight convergence $b$ of surface areas 32 facilitates the discussed tight compaction of the root clump within the gripping chamber, while the vertical convergence represented by the angle $c$ of FIG. 3 enables the root clump to be more tightly gripped as a result of upward movement of the tool, all in a manner optimizing the gripping and pulling effect. These angularities also assist in permitting easy removal of the gripped weed from the tool after the weed has been pulled from the earth. Any dirt which may be present in the compaction chamber before a particular weed pulling operation is forced out of the open inner exit end of the compaction chamber (out of the left end in FIGS. 1 and 2) in a highly effective self cleaning action.

To define the structure which gives the self cleaning action in slightly different terms, the compaction or compression compartment 34 between surfaces 32 may be considered as having an entrance end (at 31 in FIGS. 1 and 2) which opens and faces in a first direction transversely of and away from the axis of the shank (rightwardly in FIGS. 1 and 2) and into the entrance throat of the device, and having an exit end opening in the opposite direction generally transversely of the shank (leftwardly in FIGS. 1 and 2) for escape of dirt from the exit end of the compaction compartment in front of a weed. This exit end of the compaction compartment should for best results be open in the defined 'opposite' direction (leftwardly) throughout substantially the entire vertical extent of the compartment up to or above essentially the level of the upper surfaces of the prongs at the inner ends of those surfaces adjacent the shank (i.e up to essentially the level of the highest portions of the inner ends of the upper surfaces of the prongs) to thereby enable movement of dirt from the compaction compartment through its exit end without abutment against any shoulder obstructing such movement.

FIG. 6 shows the manner in which the weed in its entirety is held by the tool after removal from the earth, and until a user pulls the weed out of the retaining guideway or chamber, that is, in a rightward direction in FIGS. 2 and 6. FIG. 6 also shows use of a variational type of handle 16a, in lieu of the handle 16 of FIG. 1, and including a solid body of plastic, wood, or the like into which the shank 17a of the tool is appropriately connected.

FIG. 7 shows another variational arrangement, which may be considered as identical with that of FIGS. 1 to 5 except that the guiding surfaces 28b of prongs 18b extend directly vertically rather than at a downwardly converging angularity as in FIGS. 3 and 5, with the inner portions 32a of those surfaces (corresponding to portions 32 of FIG. 2 and defining the compaction or gripping chamber) being disposed directly parallel to one another and in parallel vertical planes, rather than at the doubly converging slight angularities $b$ and $c$ of FIGS. 2 and 3. The gripping action is approximately the same in this case, but without the advantages attained by the angularities previously discussed. As a further variation, it is possible that in some cases the surfaces 32 and 29 of FIGS. 3 and 5 might be divergent downwardly rather than upwardly; but regardless of the angularities, surfaces 32 should in all cases be more parallel to one another than are entrance throat surfaces 29, and desirably should be close enough to parallelism to be considered approximately or generally parallel.

While certain specific embodiments of the present invention have been disclosed as typical, the invention is of course not limited to these particular forms, but rather is applicable broadly to all such variations as fall within the scope of the appended claims.

I claim:
1. A weed puller comprising:
a handle;
a shank which is carried by said handle and projects downwardly therefrom during a weed pulling operation;
two prongs carried by a lower portion of said shank and projecting laterally therefrom generally transversely of said shank in a spaced relation defining a guideway therebetween for receiving a portion of the weed slightly below ground level;
said two prongs having opposed surfaces facing generally toward one another between which said weed is receivable in guided and confined relation, and which, in advancing inwardly toward the shank, have outer first portions which converge relatively rapidly toward one another and define therebetween an entrance throat, and inner second portions which extend more parallel to one another than said outer first portions and form a compression compartment into which said weed is directed by said entrance throat and within which the weed is compressed and tightly frictionally retained to effectively connect the weed to the tool for bodily removal of the weed in its entirety including its roots from the earth by the tool;
said compression compartment having an entrance end opening and facing in a direction generally transversely of and away from said shank and into said entrance throat, and having an exit end opening in an opposite direction generally transversely of said shank for escape of dirt from said exit end of the compression compartment in front of a weed in a self cleaning action, said exit end of said compression compartment being open in said opposite direction throughout substantially the entire vertical extent of the compartment up to essentially the level of the upper surfaces of said prongs at their inner ends adjacent the shank, to thereby enable movement of dirt from the compression compartment through said exit end without abutment against a shoulder obstructing such movement.

2. A weed puller as recited in claim 1, in which said inner portions of said surfaces are substantially directly parallel to one another.

3. A weed puller as recited in claim 1, in which said inner portions of said surfaces are disposed at a slight angularity to one another.

4. A weed puller as recited in claim 1, in which said inner portions of said surfaces, in advancing inwardly toward said shank, converge slightly toward one another but at an angularity much less than the converging angularity of said outer first portions of said surfaces.

5. A weed puller as recited in claim 1, in which said inner portions of said surfaces converge slightly toward one another as they advance downwardly.

6. A weed puller as recited in claim 1, in which said outer first portions of said surfaces, in addition to said convergence as they advance inwardly toward said shank, also converge gradually toward one another as they advance downwardly.

7. A weed puller as recited in claim 1, in which said inner portions of said surfaces converge slightly toward one another as they advance inwardly toward said shank, and also as they advance downwardly.

8. A weed puller as recited in claim 1, in which said inner portions of said surfaces converge slightly toward one another as they advance inwardly toward the shank, and both said first portions and said inner portions of said surfaces also converge gradually toward one another as they advance downwardly.

9. A weed puller as recited in claim 8, in which the angle of convergence of said first portions of said surfaces in a direction inwardly toward the shank is between about 50° and 70°, and the angle of convergence of said inner portions in a downward direction is not more than about 5°.

10. A weed puller as recited in claim 1, in which said compression compartment has a minimum width between about 0.040 and 0.060 of an inch.

* * * * *